United States Patent

[11] 3,577,040

| [72] | Inventor | Richard H. Campbell, Jr.<br>Gilford, N.H. |
|---|---|---|
| [21] | Appl. No. | 762,723 |
| [22] | Filed | Sept. 26, 1968 |
| [45] | Patented | May 4, 1971 |
| [73] | Assignee | Pneumo Dynamics Corporation<br>Cleveland, Ohio |

[54] SOLENOID CONTROL CIRCUIT
3 Claims, 1 Drawing Fig.

[52] U.S. Cl.................................................. 317/148.5,
317/154, 321/43
[51] Int. Cl...................................................... H02m 7/44,
H01h 47/32
[50] Field of Search.......................................... 317/123
(CD), 148.5, 148.5 (B), 154; 321/43

[56] References Cited
UNITED STATES PATENTS
3,181,039  4/1965  Binder et al. ................. 317/154

3,268,776  8/1966  Reed ........................... 317/148.5
OTHER REFERENCES
General Electric, Silicon Controlled Rectifier Manual, 2nd edition, December 29, 1961, pages ii, iii

*Primary Examiner*—Lee T. Hix
*Attorney*—Stephen M. Mihaly

ABSTRACT: An electronic circuit for actuating a solenoid load from an AC power source in a two-step sequence wherein a high DC voltage is initially applied to "pull-in" the solenoid armature and a lower voltage maintains the armature in a "hold" condition. Silicon-controlled rectifiers (SCR's) provide an electronic switching and rectification of the voltage for operating power. The circuit is controlled by an electrical signal which conditions the SCR's to provide operating voltage during alternate half cycles of the power source and a time delay circuit allows conduction of the "pull-in" SCR for only a few cycles of the power source.

PATENTED MAY 4 1971
3,577,040
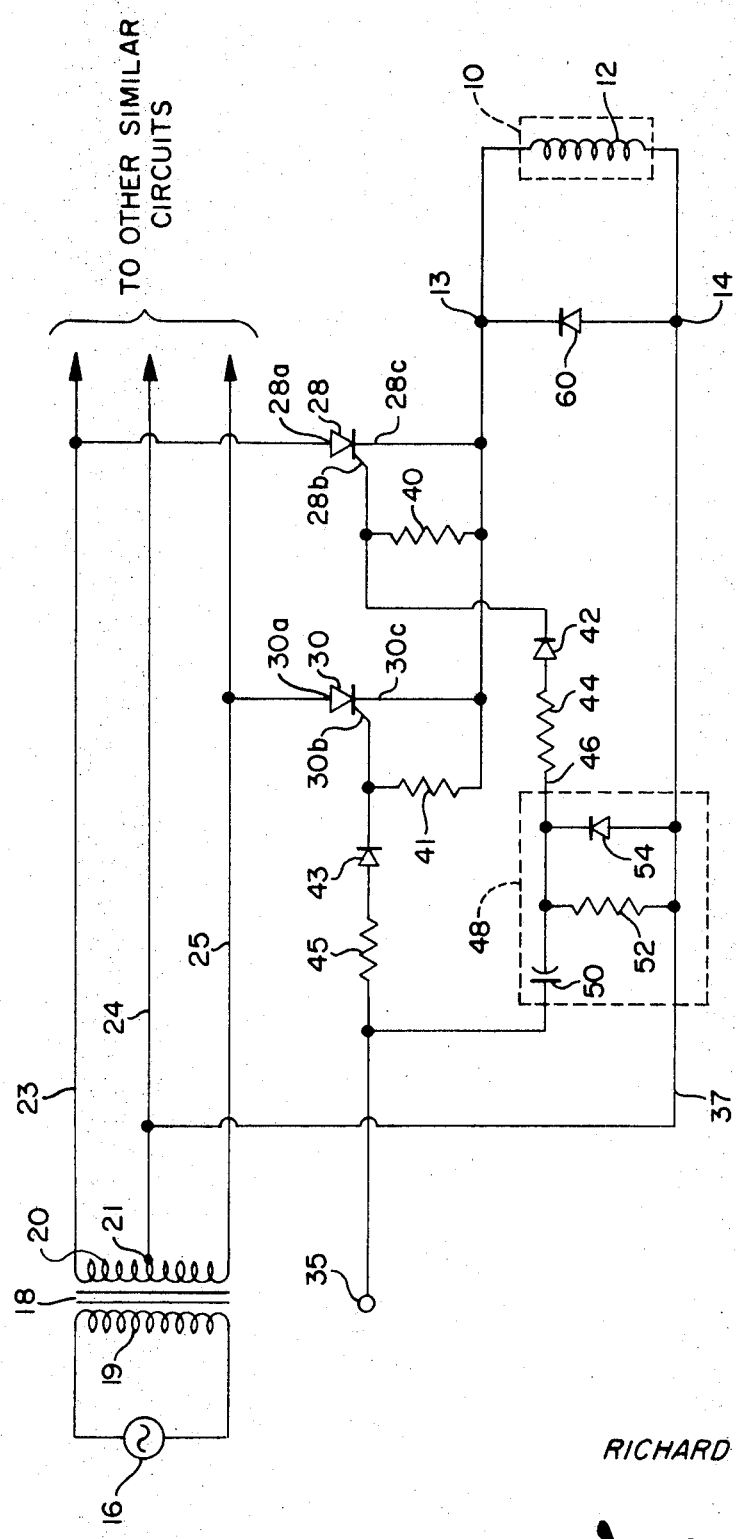
INVENTOR
RICHARD H. CAMPBELL, JR.
BY Stephen M. Mihaly
ATTORNEY

3,577,040

SOLENOID CONTROL CIRCUIT

This invention relates generally to machine control circuitry and more particularly to a control circuit for solenoid-operated devices wherein it is desired to realize minimum current consumption and more reliable solenoid operation.

Typical AC solenoid devices are designed with low electrical resistance characteristics in that high levels of electrical power are consumed when the solenoid is initially energized. This is necessary, in part, in order to overcome the mechanical inertia of the device and also to compensate for establishing a magnetic field over a relatively large width of gap. In these devices it is usual for the gap in the magnetic circuit to close as the solenoid pulls in, thereby increasing the effective inductance and limiting the power consumption to a much lower hold level.

It is preferable, however, that solenoid devices operate from a DC source of power in that smoother operation is obtained due to the absence of magnetic phase reversal. Along with this is the fact that pull-in power can be substantially smaller as well as hold power meaning a savings in energy consumption and a reduction in solenoid heating during the long hold periods.

Further, it has been determined that pure DC is not required in these circuits in that essentially the same operation can be obtained from a half-wave, rectifier, unfiltered source of power provided that a diode is connected in reverse polarity across the load. Such diode acts to provide a path for continued load current flow to prevent collapse of the magnetic field and aids in preventing chattering and inadvertent drop out of the solenoid. This current flow is maintained by the load inductance on alternate half-cycles of the power source.

With DC energization, however, some means must be provided for supplying different power levels for pull-in and hold. The solenoid inductance change serves little purpose in the DC mode of operation and pull-in power cannot be maintained without overheating the solenoid. Conventional voltage-dropping schemes utilizing inserted impedances, create additional heat losses and are impractical in a circuit where it is desired to economize on power consumption.

Therefore, it is an object of this invention to provide a solenoid control circuit which operates from an AC source of power having a two-step application of power.

It is another object of this invention to provide a solenoid control circuit which is adaptable to electronic logic circuits and which requires only a steady state DC signal for energization.

It is another object of this invention to provide an improved solenoid control circuit which utilizes only solid-state devices, eliminating all relays, make or break arcing contacts, and switching transients.

It is a still further object of this invention to provide an improved solenoid control circuit which operates in a dual current mode and which requires no series-dropping elements with consequent heat and power losses and which is of an economical form suitable for multiple applications in machine tools and the like, requiring only a minimum of components.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

The single FIG. is a circuit diagram illustrating a preferred embodiment of the invention.

In this circuit AC power is provided at two voltage levels, a high level which is near the nominal voltage rating for which the solenoid is designed for initial energization or pull-in of the same, and a substantially lower voltage level for continuous energization of the solenoid in a hold mode of operation. Preferably, the two voltage levels are supplied in opposite phases such that operation of the solenoid from either phase is independent of the other. A pair of low-cost silicon-controlled rectifiers, (SCR's), provide both the switching and rectification functions to operate the solenoid on a controlled DC basis. Inherent AC line commutation is utilized for the SCR's so that no specialized turnoff circuitry is required.

This circuitry is adapted for energization from an electrical signal provided from conventional logic circuits which may perform computation functions for control of a machine tool, for example. The control voltage is a DC level characterized by the presence of approximately 15 to 25 volts DC or a zero volt potential. Energization of the solenoid is maintained so long as the control signal is present. The control voltage is applied directly to the gate of the low-voltage SCR and to the gate of the high-voltage SCR by way of a time delay circuit. Pull-in voltage is received from the high-voltage SCR and is applied directly to the solenoid every half-cycle of the power source. On the alternate half-cycles low voltage is applied also directly to the solenoid load; however, this voltage does not appreciably affect the pull-in characteristics of the solenoid.

Current flow will continue through both SCR's for a short interval of time until the time delay circuit prevents further switching of the high-voltage SCR. This time interval is on the order of three or four cycles of the power source, being provided by a conventional RC circuit arrangement. Subsequently, solenoid energization will be maintained by the low voltage SCR for the duration of the hold interval.

When the control voltage is removed insufficient gate current will be supplied to either the low- or high-voltage SCR and the solenoid will be deenergized as soon as the energy stored therein is dissipated in the internal circuit including a diode connected in parallel across the solenoid load.

Referring now in detail to the FIG., there is shown a circuit diagram of a preferred embodiment of this invention wherein a typical solenoid load 10 is depicted as an inductor 12 connected to a pair of output terminals 13, 14, of the circuit, such load 10 representing, for example, a solenoid-operated hydraulic valve or the like. A source of AC power 16 is shown which may be the conventional industrial power supply of 120 volts, 60 cycles. A power transformer 18 having a primary winding 19 connected directly to the source of power 16 and a secondary winding 20 having a tap connection 21, provide voltage on lines 23—25 for application not only to this circuit but to other similar circuits in the machine tool control system.

The single secondary winding 20 of the power transformer 18 is tapped so as to provide a common line 24 and high-voltage 23 and low-voltage 25 power lines. The tap connection 21 is arranged such that the voltage appearing on the high-voltage line 23 is approximately 117 volts while that on the low-voltage line 25 is approximately 20 volts AC with reference to the common line 24. These voltages are merely representative for this preferred embodiment of the invention wherein a solenoid load 10 having a nominal rating for 120-volt operation is utilized. It will be appreciated that different voltage levels may be supplied, the only requirement being that the voltage appearing on the high-voltage line 23 is sufficient to initially energize the particular solenoid load 10 and the voltage on the low-voltage line 25 is sufficient to maintain the solenoid load 10 in an activated condition, once energized. Also, by virtue of the tap connection 21 on the single secondary winding 20, it is apparent that the voltage appearing on the high-voltage line 23 is 180° out of phase with the voltage appearing on the low-voltage line 25. It is clear also, that a similar voltage relationship could be realized in a different manner, for example, wherein multiple secondary windings of a transformer are interconnected or multiple transformer arrangements are utilized.

Connected between the high-voltage line 23 and the output terminal 13 is a high-voltage switching element consisting of a silicon-controlled rectifier, SCR 28, having its anode 28a connected directly to the high-voltage line 23 and its cathode 28c directly to the output terminal 13. Switching elements are well known in the art and many different types may be utilized in this circuit arrangement. Since the duty cycle of such switching element is very small, as will be pointed out in greater detail hereinafter, the switch can comprise a low-power, low-cost SCR having a relatively high forward current surge rating and a reverse breakdown voltage rating sufficient to accommodate the 117 volts from the secondary winding 20 of the power transformer 18.

Similarly, a low-voltage switching element is connected between the low-voltage line 25 and the output terminal 13 for supplying "hold current" to the solenoid load 10. This switching element is also an SCR 30 having its anode 30a connected to the low-voltage line 25 and its cathode 30c connected directly to the output terminal 13. An SCR having a rather low reverse breakdown voltage rating and small forward current rating may be utilized in this application since only low power levels are being switched.

Both the high- and low-voltage SCR's 28, 30 conduct positive voltage on alternate half cycles of the power source 16 when a positive potential is applied to the gate electrodes 28b, 30b respectively. Such potential is derived from a control voltage signal applied at the input terminal 35, having as reference the common line 24, connected to the output terminal 14 by way of line 37. This control voltage takes the form of a DC level varying between a zero potential and a positive 15—25 volt potential and may be derived from conventional logic circuits which operate to control various functions of the associated machine tool. The association of the circuit of the instant invention with machine tool logic circuits is merely indicative of one application for such solenoid control system. It is clear, however, that the control signal could be obtained from other devices or in any other conventional manner, such as, for example, a manually operated switch serially connected with a battery source for connecting or disconnecting the potential to the input terminal 35. The circuit of the instant invention is not particularly dependent on the rise or fall time of the control voltage applied at terminal 35 except that the voltage changes should be relatively fast and such time intervals should be somewhat shorter than several cycles of the power source.

Each of the gate circuits of the high- and low-voltage SCR's 28, 30 is similar, in part, in including bias resistors 40, 41 connected between the gate electrodes 28b, 30b and output terminal 13. The gate circuits further include isolating diodes 42, 43 serially connected in a direction to conduct positive current flow toward the gate electrodes 28b, 30b and series-connected limiting resistors 44, 45 for preventing excessive forward current gate flow.

The remote end of the limiting resistor 45 for the low-voltage SCR 30 is connected directly to the input terminal 35 while the remote end 46 of the limiting resistor 44 for the high-voltage SCR 28 is connected to receive voltage from a time delay circuit, as shown within the dashed lines 48.

The time delay circuit 48 comprises an input capacitor 50 having one end connected to the input terminal 35 and the second end connected to the remote end 46 of the limiting resistor 44 for the high-voltage SCR 28. A parallel-connected resistor 52 and diode 54, the latter poled to conduct negative voltages to terminal 14 are further connected between the remote end 46 of the limiting resistor 44 and line 37.

In this typical embodiment of the circuit the capacitor 50 may have a value of approximately 1 mfd. and resistor 52 a value of 150k. ohms, providing a time constant on the order of 150 milliseconds. The limiting resistors 44, 45 may be on the order of 15k. ohms and the bias resistors 40, 41 approximately 1k. ohms.

The circuit is completed with a diode 60 connected across the output terminals 13, 14, in parallel with the solenoid load 10 and in a polarity opposite to that of the high- and low-voltage SCR's 28, 30. It is apparent that this circuit may be designed to operate with the output terminals 13, 14 in a reverse polarity, in which application diode 60 and SCR's 28, 30 will retain the same relative relationship but be oppositely poled.

Under control of the voltage applied at the input terminal 35 the following circuit operation then obtains: when the control voltage is at zero potential the gate electrodes 38b, 30b of the high- and low-voltage SCR's 28, 30 respectively will be at cathode potential by virtue of the bias resistors 40, 41, thereby preventing a forward gate bias and conduction of the respective SCR's, although AC voltage will be continuously applied to the respective anodes 28a, 30a from the secondary winding 20 of the power transformer 18. The high reverse impedance of the SCR's 28, 30 will prevent voltage from appearing at the output terminals 13, 14 and thus prevent energization of the solenoid load 10.

When an energizing signal or a control voltage of 15—25 volts is applied to the input terminal 35, such voltage will be applied by way of the divider consisting of resistors 45, 41, to the gate electrode 30b of SCR 30 and by way of the time delay circuit 48, and the voltage divider consisting of resistors 44, 40 to the gate electrode 28b of SCR 28. The charging action of the capacitor 50 in the time delay circuit 48 allows the control voltage to be applied immediately to the gate electrode 28b of SCR 28 and resultant gating current will continue to flow until capacitor 50 is charged to approximately the voltage applied at the input terminal 35. This static condition then will prevent further gate current to electrode 28b of SCR 28, such condition occurring after a short interval of time which is on the order of several cycles of the power source 16. The time delay circuit 48 thus acts as a form of pulse generator responsive to application of the control signal at terminal 35. SCR 28 will not further conduct after commutation to an off condition by reversal of the voltage applied from the secondary 20 of the power transformer 18. Low-voltage SCR 30, however, will remain in a conducting condition on alternate half cycles of the power source 16, gating current being provided continuously from the input terminal 35. Removal of the control voltage from input terminal 35 will prevent further conduction of SCR 30 and thus, deenergization of the solenoid load 10.

Thus, it may be seen that upon initial application of control voltage to input terminal 35 both SCR's 28, 30 will be immediately gated to an on condition and a high- or low-positive voltage will first be applied to output terminal 13 dependent on the time of phasing of the voltage from the secondary winding 20. The voltage received from the low-voltage SCR 30 is inconsequential to initial energization of the solenoid load 10, the pull-in power being obtained from the high-voltage SCR 28 connected to line 23 which supplies approximately 117 volts potential. On alternate half cycles when SCR 28 is commutated to an off condition by phase reversal of the voltage in line 23, solenoid load current will continue not only from SCR 30 but also by action of the diode 60 connected in parallel with the load 10. Thus, on the half cycles when SCR 28 is not conducting, the higher voltage energy stored in inductor 12 can flow through the diode 60 in the direction in which the diode 60 is poled. Such current flow in load 10 will be in the same direction as that current primarily establishing the magnetic field from the SCR 28 so as to tend to maintain the magnetic field about the inductor 12 which aids in holding the solenoid in an energized condition and prevents solenoid chatter. This diode action is especially advantageous in the hold condition when only SCR 30 is in a conducting state. Due to the less intense magnetic field retaining the armature of the solenoid in the actuated condition, armature chatter is accentuated and drop out is more likely, both of these effects being deemphasized by the action of diode 60.

As is well known in SCR switching circuits, diode 60 acts also as a freewheeling diode to aid in commutation of the conducting SCR. Thus, the tendency for the SCR 28 to continue conduction due to current maintenance by the inductive load 10 is dissipated by the freewheeling action of the diode 60 which tends to short circuit the load 10.

Upon removal of the control voltage from input terminal 35, the voltage stored on capacitor 50 will be dissipated both through the internal impedance connections of the solenoid control circuit and the external load impedance. Such discharging returns the circuit to its initial conditions in a relatively short interval of time which is insignificant in relation to the required operating time for the solenoid control circuit. While diodes 42, 43 insure the conduction of positive potentials toward the gate electrodes of the SCR's 28, 30 and serve to isolate the electrodes from negative potentials, diode 54 in the time delay circuit 48 insures that a negative charge will not be created on capacitor 50 due to the switching action of the logic circuits connected at input terminal 35.

While the component values indicated are optimum values for the preferred embodiment of this invention it is clear that substantial variations may occur without affecting the general operating characteristics of the circuit. Similarly, the delay interval of the time delay circuit 48 may be varied to a great extent to accommodate different types of load 10 which might require greater pull-in power.

It is apparent also that the circuit may be modified further to provide load 10 energization from voltages having a common phase or a full-wave variation of the circuit may be employed by a duplication of components. The embodiment described, however, is preferred in realizing a most economical form of the invention providing a savings in operating power and a dependable circuit which is significant in multiple applications commonly encountered in machine tool control systems.

I claim:

1. A circuit for energizing a solenoid from a source of AC power, comprising a power transformer energized from said source of AC power, said transformer having a secondary winding with an intermediate tap thereon to provide a relatively high-voltage terminal and a relatively low-voltage terminal, the voltages at said terminals being 180° out of phase, a first SCR having an anode-cathode path in series connection with said high-voltage tap, said solenoid and said intermediate tap, a second SCR having an anode-cathode path in series connection with said low-voltage tap, said solenoid and said intermediate tap, a diode in parallel connection with said solenoid, said diode being reversely poled with respect to said first and second SCR's, a terminal adapted for receipt of a control signal for energizing said solenoid, means connecting said terminal to the gate electrode of said second SCR for activating same during the interval of a control signal, and timing means connecting said terminal to the gate electrode of said first SCR for temporarily activating same in the interval of a control signal.

2. A circuit as set forth in claim 2 wherein said timing means comprises an RC charging circuit adapted to transmit only the initial portion of each control signal at said terminal to the gate electrode of said first SCR.

3. A circuit as set forth in claim 2 wherein said charging circuit comprises capacitor operatively connected in series with said terminal and the gate electrode of said first SCR, a fixed resistor connected between the gate electrode side of said capacitor and said intermediate tap, and a diode in shunt connection with said resistor.